W. O. WHEELER.
AUTOMATIC TENPIN SETTER.
APPLICATION FILED APR. 7, 1917.
1,297,951.
Patented Mar. 18, 1919.
8 SHEETS—SHEET 6.
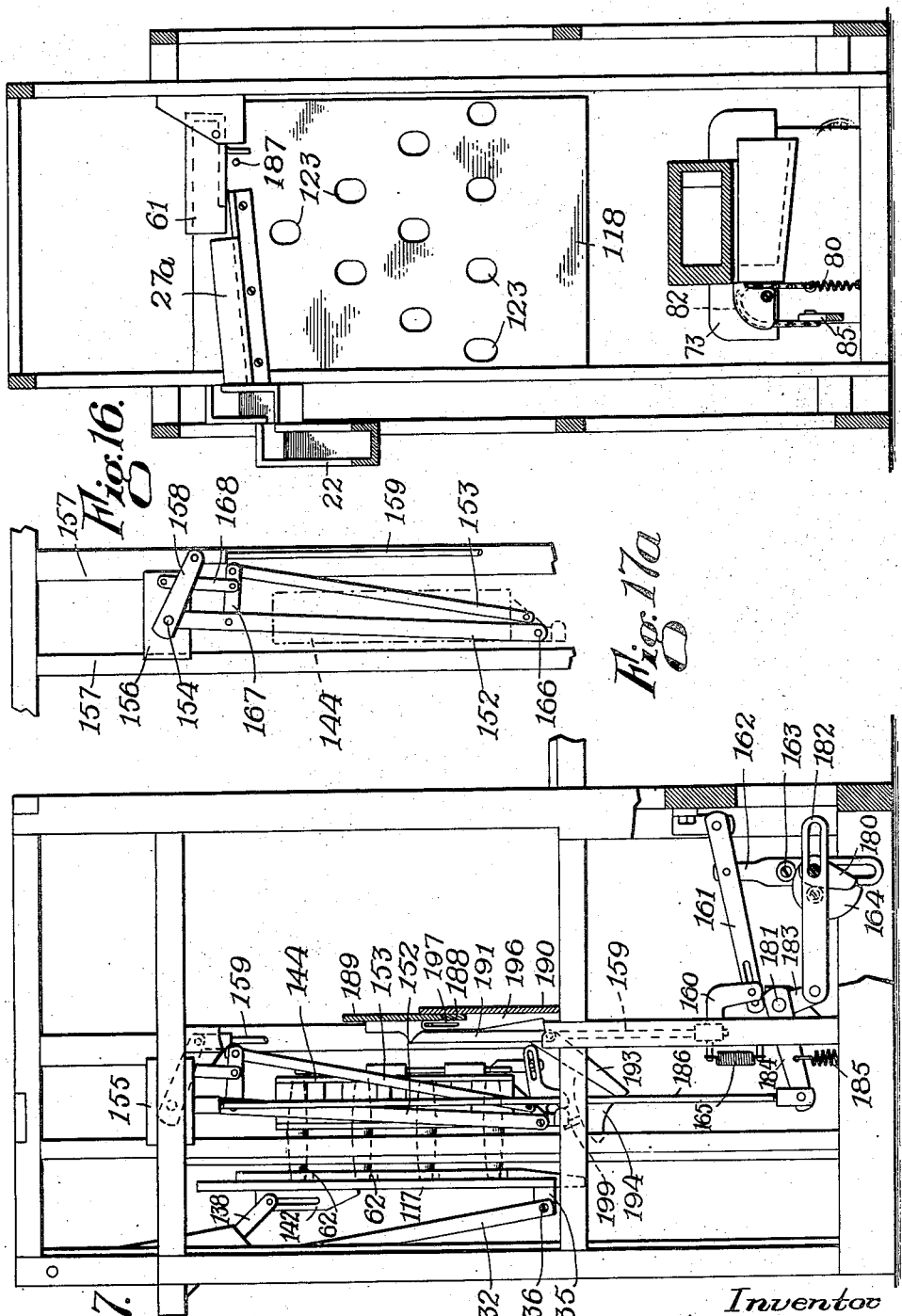

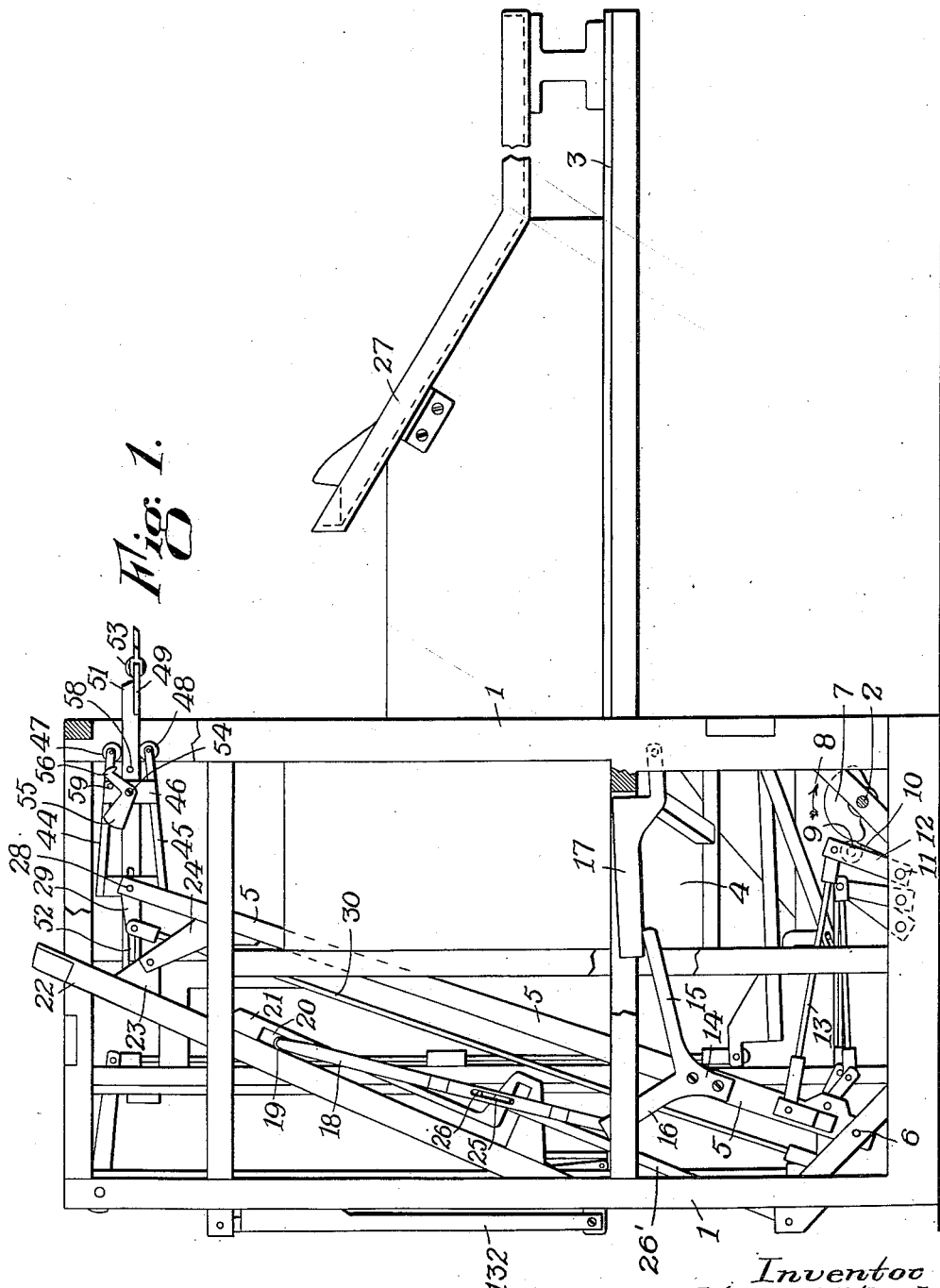

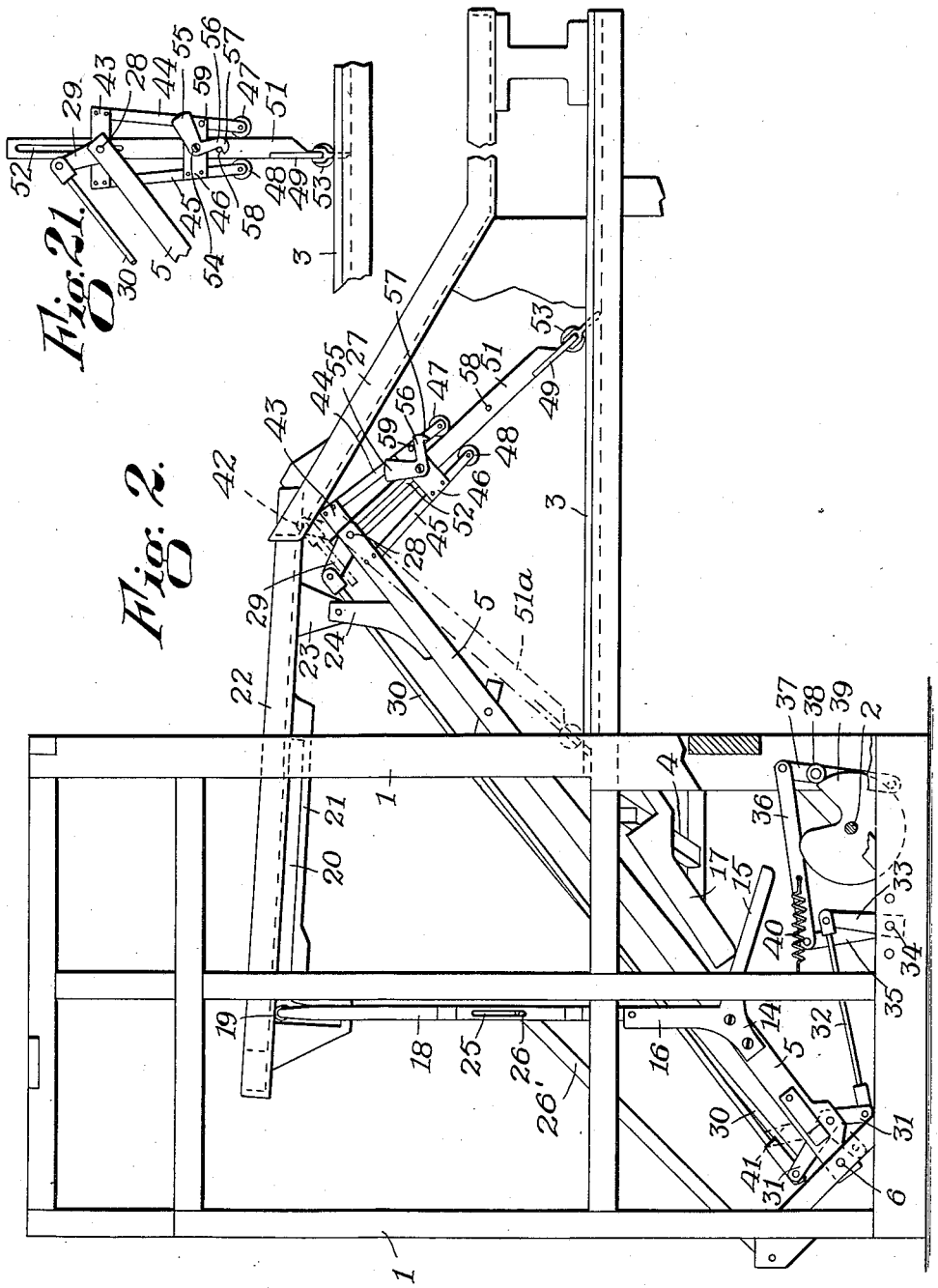

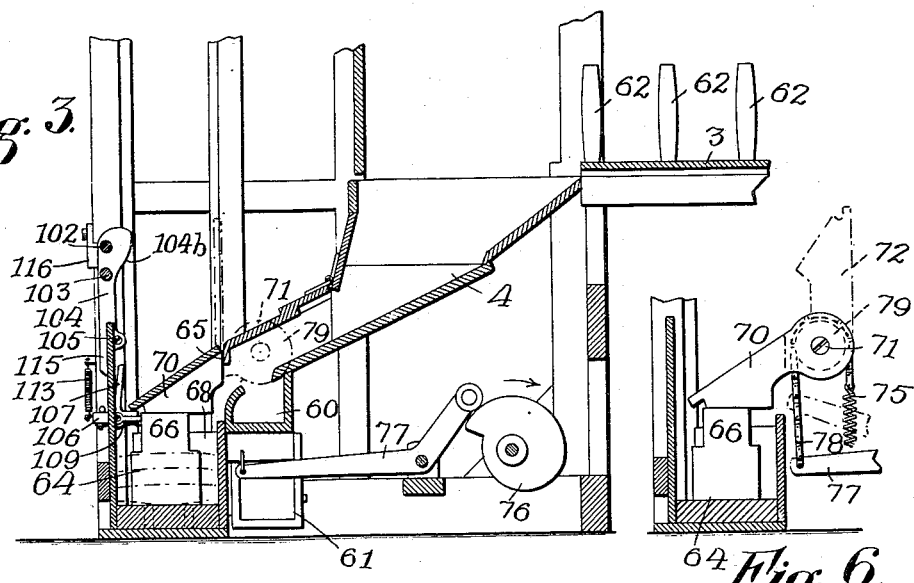

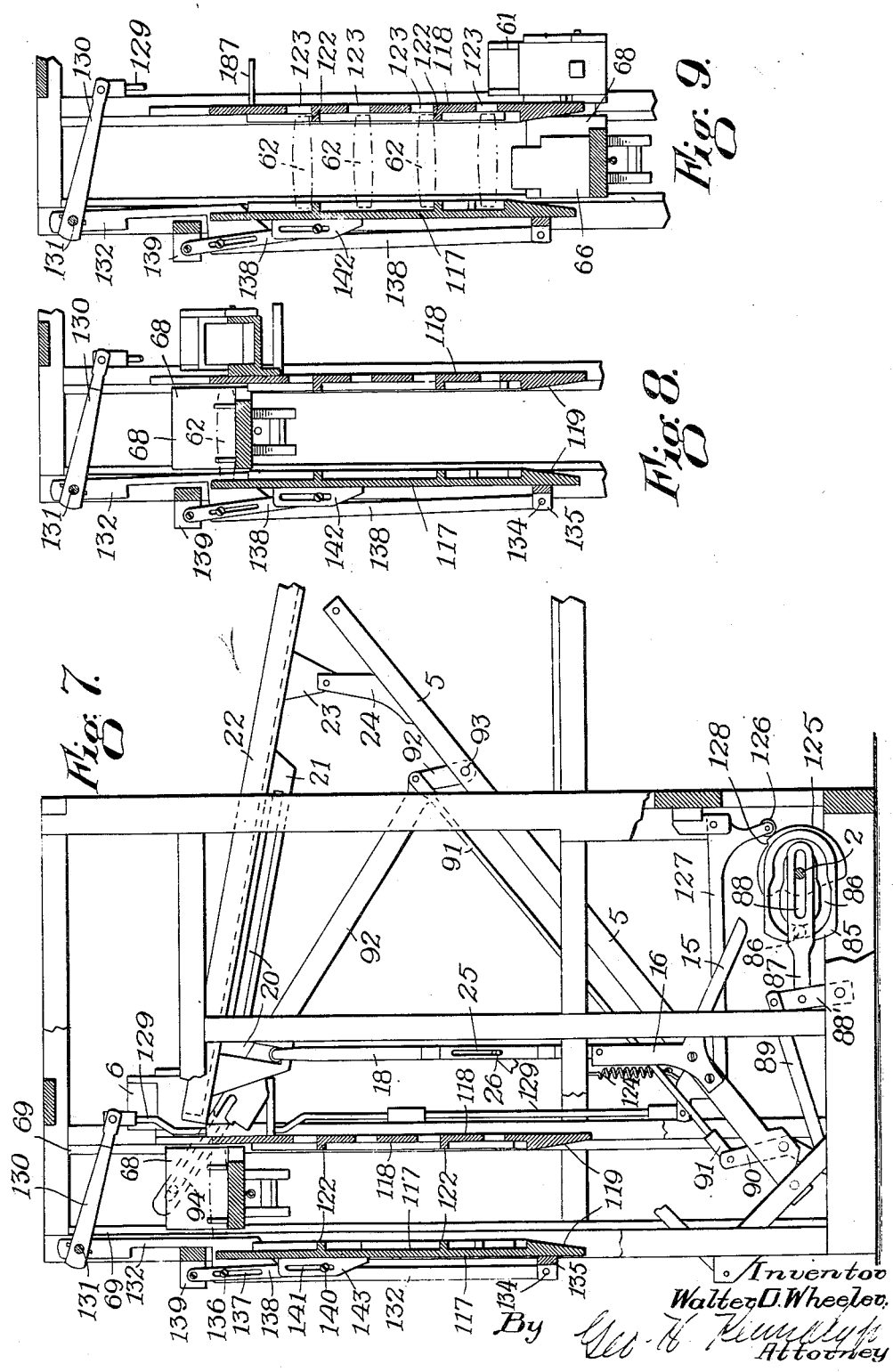

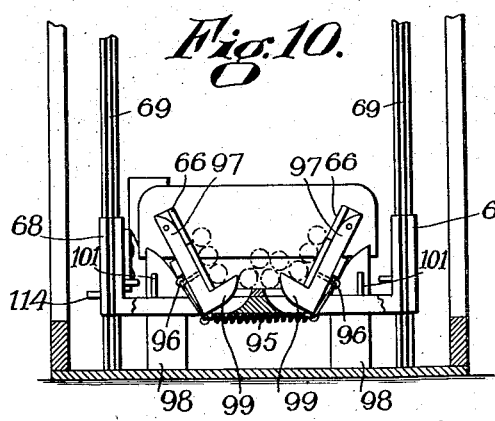
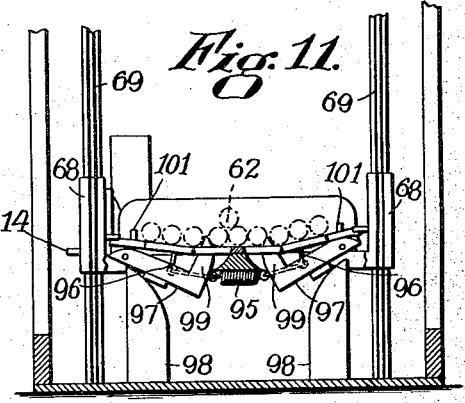
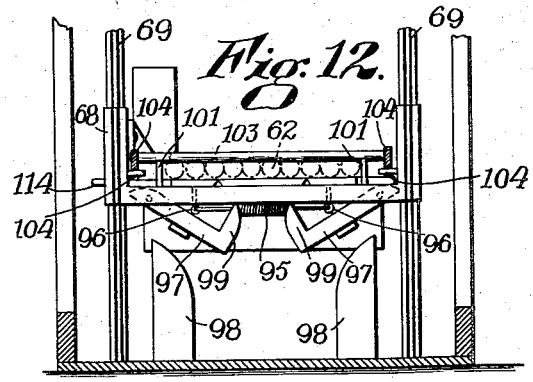
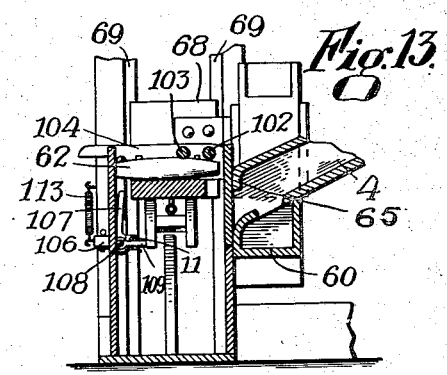
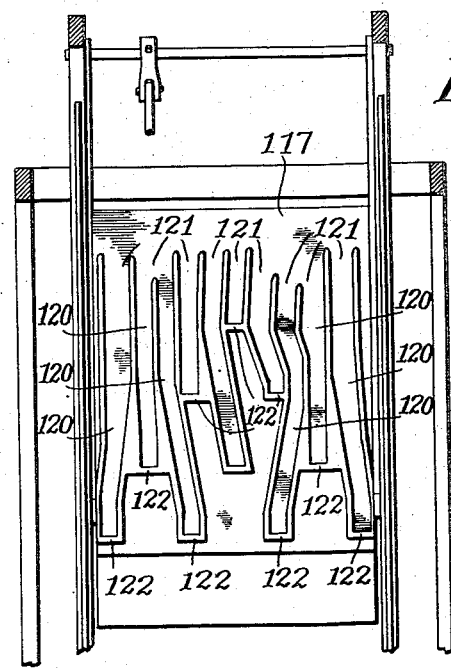
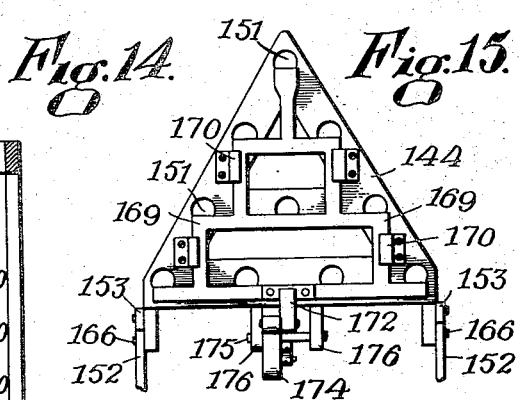

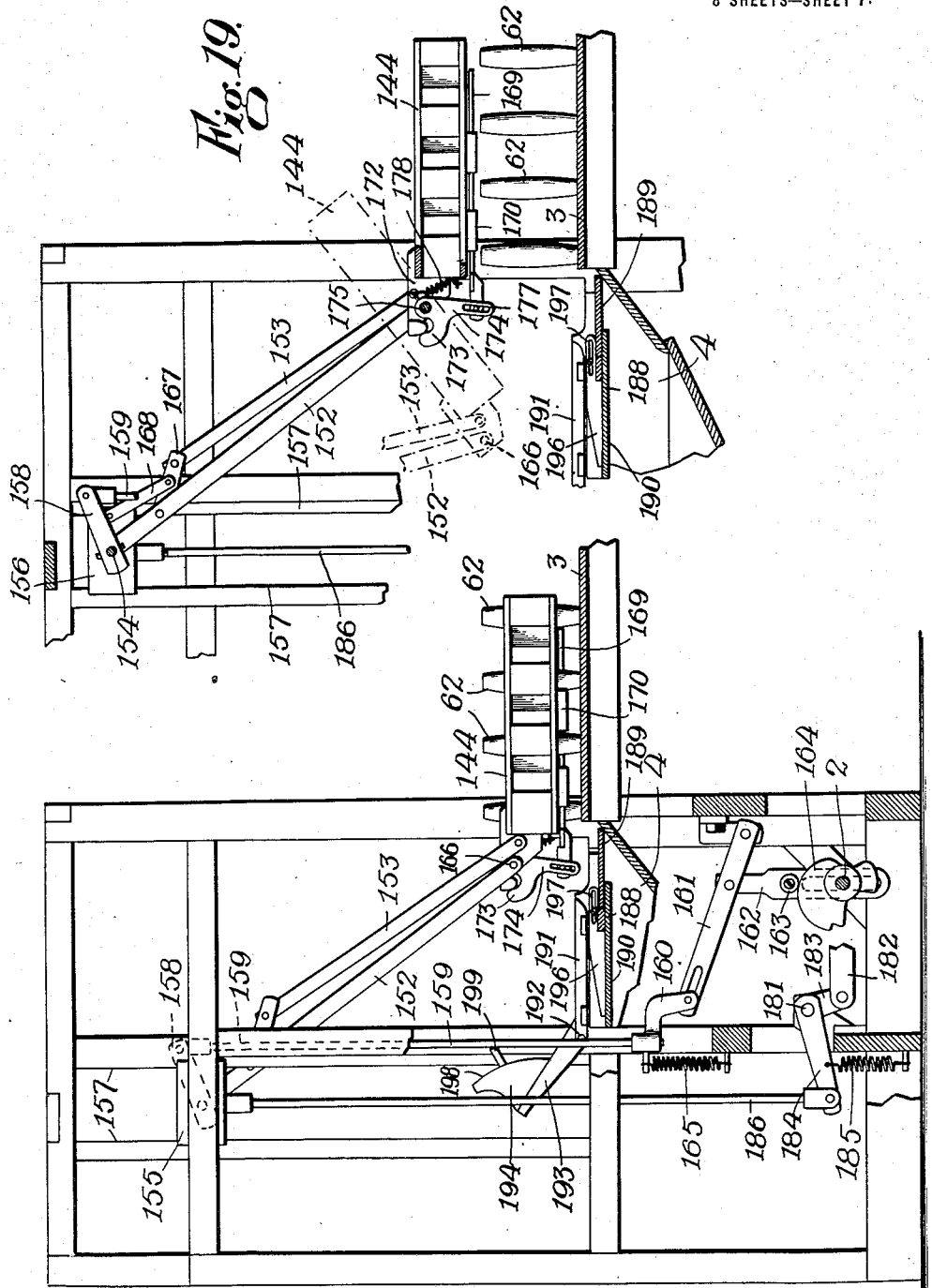

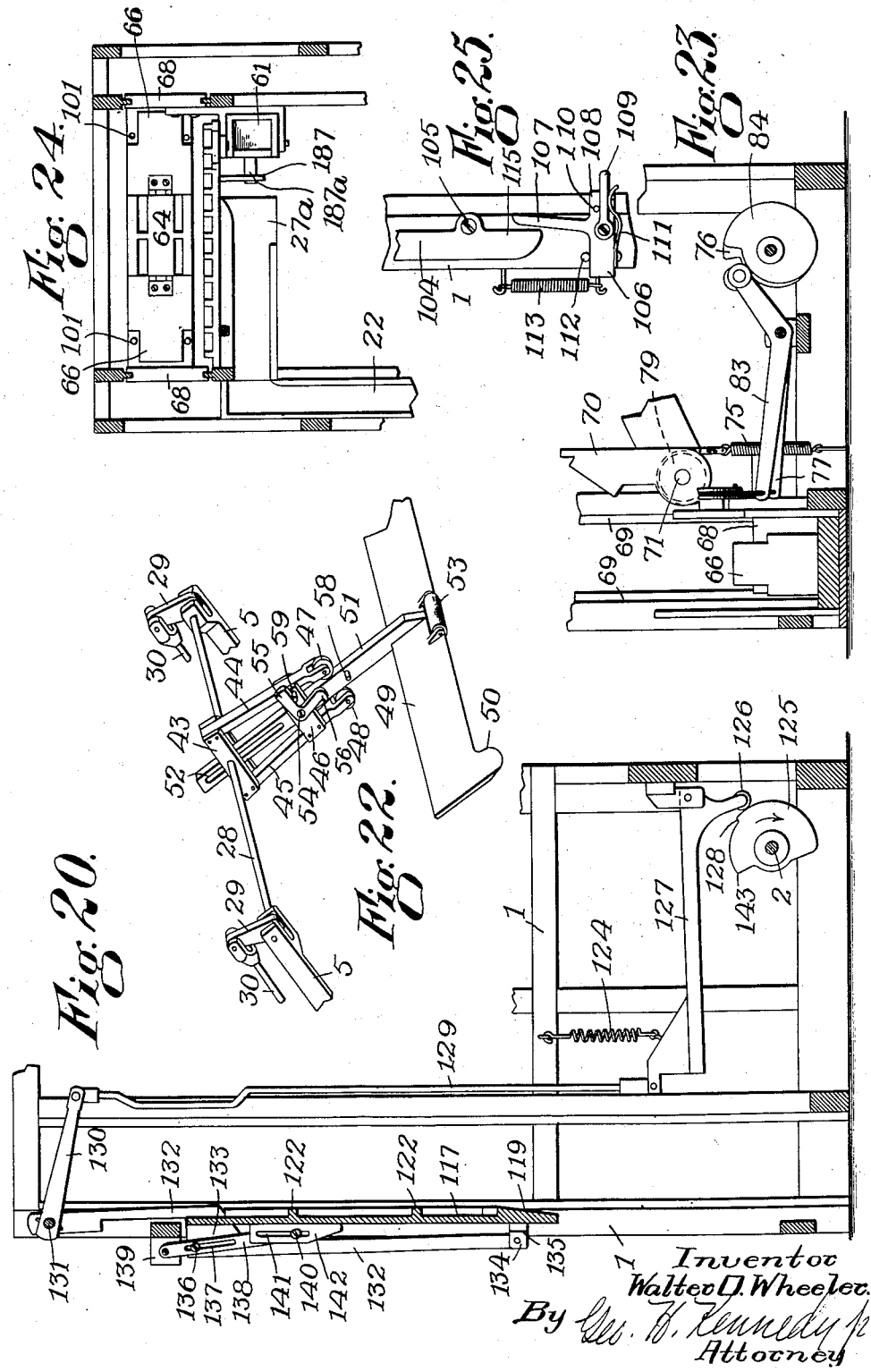

UNITED STATES PATENT OFFICE.

WALTER O. WHEELER, OF WORCESTER, MASSACHUSETTS.

AUTOMATIC TENPIN-SETTER.

1,297,951. Specification of Letters Patent. Patented Mar. 18, 1919.

Application filed April 7, 1917. Serial No. 160,467.

*To all whom it may concern:*

Be it known that I, WALTER O. WHEELER, a citizen of the United States, residing at Worcester, in the county of Worcester and Commonwealth of Massachusetts, have invented a new and useful Improvement in Automatic Tenpin-Setters, of which the following is a specification, accompanied by drawings forming a part of the same.

This invention relates to a machine for automatically clearing the alley of fallen pins, separating the balls from the pins, setting pins in triangular disposition upon the alley, and returning the balls to the player, and these several objects among others I accomplish by the construction and arrangement of parts as hereinafter described and illustrated in the accompanying drawings, in which—

Figure 1 represents a side view of the framework supporting the operative mechanism of the machine, and showing that part of the mechanism which is employed in sweeping the alley of fallen pins, which is represented in its normal or inoperative position.

Fig. 2 is a side elevation of the mechanism for sweeping the alley of fallen pins shown in its operative position.

Fig. 3 is a side view of the box in which the pins are deposited when swept from the alley, and illustrating the mechanism for controlling the position of the chute by which the pins are conducted from the hopper to the pin box.

Fig. 4 is a plan view of the pin box and box for receiving the balls, with the chute removed.

Fig. 5 is a rear view of the pin box also showing the chute in its raised position, and with a guard plate lowered to close the passageway to the hopper.

Fig. 6 is a side view of the pin box and chute.

Fig. 7 is a side view showing the mechanism for raising the pin and ball boxes, and for advancing the rearmost grooved pin alining and separating plate; the front and rear pin separating plates being shown in sectional view.

Fig. 8 is a detached view of the front and rear grooved pin separating plates shown in sectional view, with the rearmost plate in its slightly advanced position for the purpose of alining the pins as they are supported in a single row in the extended pin box.

Fig. 9 is a side view of the front and rear grooved pin separating plates, with the pins distributed therein, in position to be forced forward into a setting frame.

Fig. 10 is a rear view of the pin box in a slightly raised position, and illustrating the action of the pin separating fingers and the hinged sides of the box, partially depressed in order to form a platform for the support of the pins.

Fig. 11 is a rear view of the pin box raised in a higher position than that shown in Fig. 10, with the hinged sides of the box still further depressed.

Fig. 12 is a rear view of the pin box in a higher position than that shown in Fig. 11, with the hinged sides of the box fully depressed into a horizontal plane, and forming a platform for the pins which are supported thereon in a single row.

Fig. 13 is a side elevation of the pin box partly in sectional view and in the same position as represented in Fig. 12, with the gravity bars resting upon the pins in order to force them into a single row.

Fig. 14 is a front view of the rear grooved pin separating plate, showing the grooves by which the pins are separated and the transverse ribs or stops for arresting the downward movement of the pins and bringing them into position to be forced into the setting frame, said grooves and stops corresponding to the opposing grooves and stops on the front pin separating plate.

Fig. 15 is a front view of the setting frame, with the sliding pin retaining frame for holding the pins in the setting frame during the swinging movement of the latter over the end of the alley.

Fig. 16 is a view of the front side of the front pin separating plate showing the oval holes therethrough communicating with the grooves upon the opposite or rear side of the plate.

Fig. 17 is a side view of the setting frame in vertical or normal position, with the pins held therein, and also showing the cams and connected mechanism for swinging the setting frame from its vertical position into a horizontal position over the end of the alley and returning it to its normal position after the pins have been delivered upon the alley.

Fig. 17ᵃ represents the lever connections with the setting frame by which it is rocked from a vertical to a horizontal position and vice versa.

Fig. 18 is a side view of the setting frame in horizontal position over the alley, showing the pin retaining frame drawn back to release the pins to allow them to slide by gravity through the setting frame and rest upon the surface of the alley.

Fig. 19 is a side view of the setting frame in horizontal position over the alley but having been raised vertically to clear the pins.

Fig. 20 is a side view of the mechanism for moving the rearmost of the grooved pin separating plates forward.

Fig. 21 is a side view of a portion of the sweeper showing the gravity latch for retaining the sliding sweeper bar, said latch being shown in its operative position.

Fig. 22 is a perspective view of a portion of the sweeper mechanism showing the gravity latch for retaining the sliding sweeper bar, said latch being shown in its inoperative position.

Fig. 23 is a side view of the cam mechanisms for controlling the movements of the chute leading from the hopper to the pin box and of the guard plate for closing said passageway.

Fig. 24 is a plan view of a portion of the ball race through which the balls are returned to the player.

Fig. 25 is a fragmentary detail view of the operating means for the pin alining mechanism.

Similar reference characters refer to similar parts in the different figures.

The tenpin setting machine forming the subject of the present application comprises mechanisms for performing several distinct operations, actuated by a series of cams carried upon a single cam shaft, which is rotated for each cycle of operations of the machine through a single revolution.

The cam shaft is preferably rotated by a suitable motor having a well known clutch connection with the shaft which, brought in action by an attendant, serves to rotate the cam shaft a single revolution and become automatically disengaged. I have not deemed it necessary to illustrate or describe either the motor or the clutching mechanisms as they form no part of my present invention and they are well understood by persons familiar with machine construction.

Assuming the pins to have been set upon the alley and the usual number of balls to have been rolled by a player, the first operation of my machine is to sweep along a portion of the alley and gutters to force the balls and fallen or standing pins into a common hopper, located at the end of the alley in the position of the usual pit. Means are provided for the separation of the pins and the balls, and for conducting the pins end foremost through a chute into a pin box. The balls are caused to roll into a ball box pivotally supported upon the pin box at one side of the hopper. The pin and ball boxes are then raised, and during the upward and downward movement of the pin box means are provided for shifting the position of the pins into a single row of pins; for separating the pins and arranging them in triangular disposition corresponding to that which the pins are to occupy on the alley. The pins are then transferred to a setting frame which is swung into position over the end of the alley, and the pins transferred from the setting frame to the alley. Upon the completion of their functions the several mechanisms are returned to their normal positions.

In the accompanying drawings I have illustrated what I consider a preferred embodiment of my invention; for the sake of greater clearness, however, I have confined each of the figures to the specific mechanism for performing a single function and to those mechanisms closely allied thereto. In the following description of the accompanying drawings the order of operation outlined above will be followed as nearly as possible but it will be understood that the periods of many of the operations overlap each other.

Referring to the drawings, and especially to Figs. 1 and 2; 1 denotes the framework in which a rotatable cam shaft 2 is journaled, driven in any convenient manner through a clutch connection of the usual and well known type, not shown, by which the cam shaft becomes automatically disengaged from the driving power after each single revolution. The framework 1 is erected at the lower end of the alley 3 and incloses a hopper 4 adjacent to the end of the alley into which the balls roll and into which the pins are swept by a sweeping mechanism, comprising a swinging frame 5 having parallel bars on each side of the machine, one of which is shown in Figs. 1 and 2, and being pivoted at its lower end at 6 in the framework. The frame 5 shown in its normal position in Fig. 1 is allowed to swing by gravity into its operative position, as shown in Fig. 2, by means of a cam 7, Fig. 1. As the shaft 2 revolves in the direction of the arrow 8, the cam 7, through the cam roll 9 and arm 10 rocks the shaft 11, which, by means of the arm 12 and link 13 restores the sweeper frame to its normal position, as shown in Fig. 1. Attached to each side of the frame 5 are plates 14, one of which is shown in Figs. 1 and 2. The plates 14 are forked to form the arms 15 and 16. The arms 15 support the pivoted bars 17 at each side of the hopper 4 to hold them in a horizontal position when the frame 5 is in its normal position and allow them to swing downwardly, as shown in Fig. 2, when the frame 5 is in its operative position in order to provide space for other movable parts of the machine, as will be hereinafter explained.

Pivoted to one of the arms 16 is a link 18 which carries at its upper end a roll 19 entering a right angled or L-shaped slot 20 in a rib 21 projecting from the under side of a tilting trough 22 for conducting the balls back to the player. The ball trough 22 is provided near one end with a bracket 23 projecting from its under side and pivoted to an arm 24 projecting from the frame 5. The link 18 is slotted about midway its length at 25 to receive a stud 26 held in a swinging lever 26'. As the frame 5 swings forward from the position shown in Fig. 1 to that shown in Fig. 2 the ball trough 22 will be moved into a slightly inclined position, as shown in Fig. 2, with its lowest end entering the open end of the stationary inclined ball trough 27 leading to the player's position.

Journaled in the upper end of the frame 5 is a rock shaft 28 to which an arm 29 is attached at one end, and pivotally connected by a link 30 with one end of a bent lever 31 pivoted on the frame 5. The opposite end of the lever 31 is connected by a link 32 with an arm 33 attached to a rock shaft 34. The rock shaft 34 carries an arm 35 connected by a link 36 with a lever 37 carrying a cam roll 38 which is held against the cam 39, by a spring 40 attached at one end to the link 36 and at its opposite end to the fixed framework. As the cam 39 is rotated by the cam shaft 2, the bent lever 31 will be rocked into the position indicated by broken lines 41, Fig. 2, pushing the arms 29 on the rock shaft 28 into the position indicated by broken lines 42, and imparting a rocking motion to the rock shaft 28. The rock shaft 28 carries at its center a crossbar 43, to the opposite ends of which are attached the bars 44, 45, united about midway their length by a cross brace 46, and carrying at their free ends friction rolls 47, 48. The crossbar 43 and arms 44, 45, constitute a vibrating frame by which the sweeping blade 49 is supported, Fig. 22, extending transversely across the alley and having at its ends projections 50, adapted to extend into the gutters on either side of the alley. The sweeping blade 49 is carried by a stem, or sliding gravity bar 51, which slides between the friction rolls 47, 48 and in ways on the cross brace 46. The stem 51 is provided with a slot 52 which incloses the shaft 28.

In the normal position of the sweeper mechanism the vibrating frame and sweeper stem 51 is held in horizontal position as shown in Fig. 1, but as the sweeper frame swings toward the alley, the vibratory frame consisting of the bars 43, 44, and 45 assume an oblique position in which the stem 51 and sweeping blade slide down by gravity until checked by the rock shaft 28 reaching the upper end of the slot 52. The continued swinging movement of the frame 5 brings the sweeping blade 49 in position to sweep the alley, as represented by full lines in Fig. 2. The sweeping blade 49 is then moved into the position shown by broken lines in Fig. 2, by the swinging movement of the vibrating frame, which is effected by the action of the cam 39, Fig. 2, and spring 40, through the bent lever 31 and links 30. The above movement of the blade 49 which is raised above the alley by an antifriction roll 53 sweeps any material remaining on the alley into the hopper 4 at the end of the alley. The continued rotation of the cam 39 reverses the movement of the sweeping blade into the position shown by full lines in Fig. 2. Midway of this reverse movement when the stem 51 has reached a vertical position, as shown in Fig. 21, the stem 51 becomes locked against downward movement by means of a gravity latch pivoted at 54 on the cross brace 46. The gravity latch is a two-armed lever consisting of a gravity arm 55, and a hooked arm 56 having a beveled end 57. As the stem 51 is forced upwardly by its movement into a vertical position, a stud 58 carried by the stem strikes the beveled end 57 and rocks the gravity latch on its pivot. When the stud 58 has passed the end of the arm 56, the weight of the arm 55 swings the latch to engage the stud 58 by the hooked arm 56. When the movement of the frame 5 has been reversed sufficiently to bring the stem 51 into a substantially horizontal position, as shown in Fig. 1, the gravity arm 55 swings to raise the hooked arm 56 away from the stud 58, as shown in Fig. 1, thereby releasing the stem 51 to permit it to slide down at the next forward movement of the frame 5. A stud 59 on the cross brace 46 limits the swinging movement of the gravity latch in each direction.

The pins and balls are alike received in a hopper 4, shown in plan view in Fig. 4, and in sectional view in Fig. 3. The lower end of the hopper has a laterally inclined trough 60 in the floor over which the balls roll into a ball box 61 at one side. The pins, one of which is shown by broken lines at 62, Fig. 4, slide down the inclined bottom of the hopper, contacting at one end with a shoulder 63 formed in one side of the hopper, by which the pins are slewed around so they will pass out of the hopper by an endwise movement into a pin box 64. In passing out of the hopper the pins slide by an endwise movement, beneath a crossbar 65 raised above the floor of the hopper sufficiently to allow a pin to pass, but less than the diameter of a ball, thereby insuring the separation of the balls from the pins, allowing the former to roll over the inclined trough 60 into the ball box 61, while the pins slide with an endwise movement into the pin box 64. The pin box 64 is open on its front and rear ends, but has sides 66, 66 hinged to a horizontal bottom 67 held on a framework provided with sides 68, 68, which slide in vertical ways 69 in the upright framework of the machine. The pins are delivered from the hopper 4 through a chute 70, Figs. 3, 5 and 6, pivoted to the hopper 4 at 71, Fig. 3. Previous to the return of the sweeping mechanism 5 to its normal position, the chute 70 is swung on its pivot 71 and raised as shown in Fig. 5, and by broken lines 72, in Fig. 6. The mouth of the hopper is then closed by a guard plate 73 which is pivoted to the framework at 74, Figs. 5 and 16. The chute is raised by the spring 75, Fig. 6, attached at one end to a fixed stud in the framework, and lowered by a cam 76, Fig. 3, through a lever 77, the free end of which is connected by a chain 78 with the opposite end of the spring 75. The chain 78 passes over a sprocket 79 attached to one side of the chute. The guard plate 73 is lowered by the action of a spring 80, Fig. 16, attached at one end to the framework, and at its opposite end to a chain 81 which passes over a sprocket 82 attached to the side of the guard plate 73, and having its opposite end connected to the free end of a lever 83 whose movement is controlled by a cam 84, Fig. 23.

The raising of the chute 70 frees the path for the elevation of the pin box and the ball box pivoted to the frame supporting the pin box, which is accomplished by a cam 85, Fig. 7, having a cam groove 86, inclosing a cam roll carried on a link 87, slotted at 88 to inclose the shaft 2, and connected at its free end with a lever 88' which is pivoted at one end to the framework and pivotally connected at its free end by a link 89 with one end of a bent lever 90 pivotally supported on the sweeper frame 5. The opposite end of the bent lever 90 is pivotally connected by a link 91 with a lever 92, pivoted at one end at 93 upon the frame 5. The opposite end of the lever 92 is slotted at 94 to inclose a stud carried upon the frame supporting the pin box. Although but a single lever 92 and its actuating mechanism is shown and described it will be understood that the mechanism is duplicated upon the other side of the machine in order to simultaneously raise both sides of the pin box.

At the proper period in the operation of the machine and while the swinging frame 5 is in its operative position, as shown in Figs. 2 and 7, the action of the grooved cam 85 swings the long lever 92 and raises the frame carrying the pin box from its lowest position below the hopper into its elevated position, as shown in Fig. 7. The upward movement of the lever 92, on one side of the machine striking the end of the ball trough 22 imparts an additional tilt to the trough and brings the end of the link 18 to the end of the L-shaped slot 20.

Means are provided during the upward movement of the pin box to control the position of the pins in the box which is illustrated particularly in Figs. 5, 10, 11 and 12. In Fig. 5 the pin box is shown in its lowest position with the pins 62 held in three rows on the bottom 67 of the box and between the hinged sides 66, 66. As the pin box rises, the hinged sides 66 begin to fall apart by the action of a spiral spring 95 Fig. 10, connecting a pair of eye bolts 96 inserted in the under sides of the hinged sides 66. Pivoted to the hinged sides 66 are hooked levers 97 which bear against the curved edges of the upright stationary cam plates 98 which are supported by the framework of the machine. In the lowest position of the pin box, as shown in Fig. 5, the cam plates crowd the hooked levers 97 and hinged sides 66 into an upright position, with the hooked lower ends 99 of the levers 97 held horizontally beneath the bottom of the pin box. As the levers 97 pass over the curved edges of the stationary cam plates 98 the sides 66 gradually fall apart and their swinging movement causes the hooked ends 99 of the levers 97 to swing upwardly through openings 100, Fig. 4, in the bottom of the pin box for the purpose of spreading the pins, as shown in Figs. 10 and 11, and enabling them to fall into a single row as seen in Fig. 12, with the ends of the row held between short pins 101 projecting upward from the frame carrying the pin box. As the pin box is elevated above the stationary upright cam plate 98 the hooked levers fall by gravity below the bottom of the pin box and are held by the contact of their upper ends with the hinged sides 66.

As the pins 62 approach a single row they are struck by a pair of gravity bars 102, 103 extending transversely across the row of pins and carried by a pair of levers 104, pivoted at 105 to the framework at each side of the machine and normally held in an upright position, as shown in Fig. 3. Pivoted to the frame of the machine below one of the levers 104 is a three-armed lever comprising the arms 106, 107, and 108, Fig. 25, pivoted at the intersection of the arms to the framework of the machine. Pivoted on the same stud as the three-armed lever is a lever 109, extending beyond the end of the arm 108, and normally held against a stud 110 by means of a spring 111 attached to the arm 106 and extending beneath the lever 109. The arm 106 is normally held against a stop pin 112 by a spring 113 connecting the free end of arm 106 with a fixed point on the frame of the machine. During the upward movement of the pin box a stud 104ª projecting from one of the sides 68 of the frame carrying the pin box strikes the end of the lever 109 which projects beyond the arm 108 and, by means of the stud 110, rocks the three-armed lever and carries its arm 107 against the end 115 of the lever 104, which in its normal upright position has rested against a stop 116 on the frame slightly to one side of the pivot 105. The arm 107 swings the lever 104 past its pivotal center to allow it to fall by gravity and carry the bar 102 violently against the pins held in the pin box in order to force the pins into a single row. The continued upward movement of the pin box lifts the gravity bar 102, rocking the levers 104 on their pivots and eventually bringing the gravity bar 103 into contact with the pins in the pin box in order to still further crowd the pins into a single row held between the pins 101, as shown in Fig. 12. As the pin box is moved upward the stud 104$^a$ contacts with the under side of one of the levers 104 and swings the gravity bars 102, 103, out of contact with the pins in the pin box, and by means of the cam surface 104$^b$, Fig. 3, moves the levers 104 past their pivotal center and against the stop 116.

The continued upward movement of the pin box carries the pins between a pair of grooved alining and pin separating plates 117 and 118, shown in sectional view in Figs. 7, 8 and 9. The inner or opposing surfaces of the plates 117, 118, are beveled at their lower edges at 119, 119, in order to even the pins and cause them to clear the grooved surfaces of the plates as they are moved upward. When the pins have reached their highest position, as shown in Fig. 7, a slight forward movement is given to the rearmost plate 117 in order to push the pins forward against a plane surface of the foremost plate 118, with the opposing ends of the pins projecting over the grooves in the pin alining plates 117, 118, as shown in Fig. 8. The alining plates are provided on their opposing surfaces with duplicate sets of grooves 120, that upon the rearmost plate 117 being shown in Fig. 14. The grooves 120, ten in number upon each plate, have their upper ends 121 open and their lower ends closed by cross bars 122. The pin box is next lowered, causing the ends of the pins which project beyond the pin box to enter the open ends of the grooves and to descend with the box until arrested by the cross bars 122. The grooves 120 and bars 122 are arranged to leave the pins triangularly disposed, or in the same relative position as that occupied by them on the alley, with each pin in alinement with a hole 123 through the front grooved plate 118, as represented in Fig. 9, the arrangement of the holes 123 being shown in Fig. 16. The two forward movements of the rear grooved plate 117 are effected by means of a spring 124 controlled by a single acting cam 125, Fig. 20. As the cam 125 revolves, and the cam roll 126, carried by the pivoted bell crank 127, reaches the offset 128, the spring 124 is permitted to raise the bell crank 127 and through the link 129 to raise the lever 130 attached to the rock shaft 131 journaled in the frame of the machine. Attached to the rock shaft 131 are a pair of levers 132, one of which is shown in Fig. 20. The levers 132 which are arranged on opposite sides of the grooved plate 117 are provided with an offset 133 and have their free ends pivoted at 134 to a lug 135 projecting from the lower end of the grooved plate 117. The levers 132 carry at their offsets a stud 136 entering a slot 137 in a lever 138 pivoted at its upper end to a lug 139 projecting from the framework of the machine. The lower ends of the levers 138 carry studs 140 entering slots 141 in a lug 142 projecting from the rear side of the grooved plate 117. The above described arrangement of levers secure a parallel movement of the grooved plate 117 as the shaft 131 is rocked. The first forward movement of the plate 117, accomplished when the offset 128 reaches the cam roll 126, evens the ends of the pins in the pin box as already described, and when the point 143 of the cam 125 reaches the cam roll 126, the spring 124 raises the bell crank 127 still farther at the time when the pins aline with the holes 123 and rocks the shaft 131 to move the rearmost plate 117 forward sufficiently to push the pins through the holes 123 into a triangular setting frame 144, shown in its normal or upright position in Fig. 17, and in detached view in Fig. 15.

The setting frame 144 is provided with circular holes 151, Fig. 15, into which the pins are pushed by the second forward movement of the rear grooved plate 117, the pin box having been previously lowered into the position shown in Fig. 1, between the stationary cam plates 98, 98. The setting frame 144 is triangular in shape and is pivotally connected at opposite corners of its base to the lower ends of levers 152, 153, Figs. 15, 18 and 19. The lever 152 is attached at its upper end to a rock shaft 154 which is journaled at each end in elevating blocks 155, 156 sliding in ways 157 in the framework. The rock shaft 154 carries an arm 158 to the free end of which a link 159 is pivotally connected, said link carrying an angular arm 160 at its lower end, Fig. 18, pivoted upon a stud adjustably held in a slotted lever 161 pivoted at one end to the framework. Pivoted to the lever 161 is a slotted link 162 embracing the cam shaft 2, and carrying a cam roll 163 which is held against a cam 164 by a spring 165 connecting the arm 160 with a fixed stud on the framework. As the cam 164 raises the lever 161 the shaft 154 is rocked to swing the levers 152 forward and thereby bring the setting frame over the end of the alley.

During the swinging movement of the lever 152 the setting frame is tilted from its normal vertical position, as represented in Fig. 17, into a horizontal position, as shown in Fig. 18, the holes 123 in plate 118 being elongated to prevent tipping of the pins held in the setting frame. The tilting of the setting frame is accomplished by a combination of levers comprising levers 153 pivoted at their lower ends to the corner of the setting frame slightly in advance of the pivotal connection 166 of the lever 152. The lever 153 is pivoted at its upper end, Fig. 17a, to one end of a short lever 167 which is pivoted at its opposite end to the lever 152 and between its ends to a swinging lever 168.

When the setting frame is in its upright position, the system of levers connected with lever 153 occupy the positions shown in Fig. 17, but as the shaft 154 is rocked to move the lever 152 forward the lever 153 is pushed lengthwise by the short lever 167, thereby tilting the setting frame on its pivotal connection 166 with the lever 152 and bringing the setting frame into the horizontal position, as shown in Fig. 18, the then position of levers connected with lever 152 being more clearly shown in Fig. 19.

During the tilting movement of the setting frame the pins 62 are prevented from sliding by gravity through the setting frame by a frame 169, Fig. 15, slidable in ways 170 on the under side of the setting frame and projecting over holes 151 in which the pins are held. The slidable frame 169 is held in the position shown in Fig. 15, by means of bar 172 projecting from the frame 169, having its free end in contact with an arm 173 projecting from a lever 174 which is carried by a rocking shaft 175 journaled in brackets 176 extending from the setting frame 144. The lever 174 is slotted at 177 to receive a pin carried by the slidable frame 169, serving to hold the slidable frame 169 in its advanced position. As the setting frame 144 is tilted into a horizontal position, the end of the bar 172 is moved off the end of the arm 173, allowing a spring 178 connecting the setting frame with the slotted lever 174, to retract the slidable frame and release the pins 62, which fall by gravity until they rest upon the alley 3, as represented in Fig. 18. The cam 180, Fig. 17, then rocks the shaft 181 through the link 182 and arm 183 to raise the arm 184 against the spring 185, and through the link 186 to elevate the blocks 155 and 156 in the ways 157. As the levers 152 and 153 are supported by the blocks 155 and 156 the setting frame 144 is raised above the alley far enough to clear the pins 62 which are left standing on the alley, as represented in Fig. 19. The continued rotation of the cams 164 and 180 permit the springs 165 and 185 to return the setting frame to its normal vertical position.

The balls which have been deflected into the ball box 61 by the laterally inclined trough 60 are raised to the top of the framework by the elevation of the pin box 64 to which the ball box is pivoted above its center of gravity. At the top of the framework the ball box 61 is tipped by means of a stud 187 held in the framework, thereby emptying the balls into the transverse trough 27a, from which they are returned to the player through the movable trough 22 and fixed trough 27.

In order to provide room for the forward advance of the sweeper frame 5, I pivot the bars 17 forming the rim portions of the hopper upon each side to the framework and support their free ends on the tips of the arms 15, Fig. 1. When the setting frame is in its vertical position, as shown in Fig. 17, I close the opening in front of the setting frame by a guard plate 188 to protect the mechanism from the accidental impact of balls or pins during play. When the setting frame is moved forward over the alley, the guard plate 188 falls forward into a horizontal position, as represented in Fig. 18. The guard plate 188 consists of two sections 189 and 190. Section 189 is rigidly attached to a rocking frame 191 carried on a rock shaft 192 journaled in the framework of the machine and provided with an arm 193, having on its end a counterweight 194 to partially balance the weight of the rocking frame 191 and the guard plate 188. The section 190 of the guard plate is attached to a frame 196 which is slotted at 197 to receive a stud held in the frame 191.

The guard plate 188 is raised from its horizontal position, shown in Fig. 18, to the vertical position represented in Fig. 17, as follows:—When the setting frame is swung back from its position represented in Fig. 19, it assumes a vertical position above the counterweight 194, and as the elevating blocks 155, 156, are lowered to drop the setting frame to its normal position to receive the next installment of pins, the base of the setting frame first strikes and slides over the curved surface 198 of the counterweight 194, thereby imparting an initial rocking movement to the rock shaft 192, and in its further descent striking a stud 199 projecting from the counterweight and completing the rocking movement of the shaft 192 to raise the guard plate to its vertical position. As the guard plate 188 falls into its horizontal position the lower edge of the slidable section 190 contacting with the rigid framework is pushed forward to overlap the rigid section 189, but as the guard is again raised the slidable section 190 falls down by gravity and becomes suspended by its slotted frame 196. When the guard plate 188 is in its horizontal position it serves to cover the hopper 4 and thereby to prevent access thereto.

The operation of the machine as a whole will be clear from the foregoing description of the construction and operation of its several essential mechanisms. After a player has bowled the usual number of balls, resulting in the knocking down of all or a part of the pins, the first operation of the machine is to sweep the fallen and standing pins and also the balls into a common hopper. This is accomplished by the vibrating frame 51, whose lower end, as above described, traverses the alley and the gutters and thereby carries all the balls and all the pins into the hopper 4.

Thereafter, during the gravity descent of the balls and pins through the hopper 4, the balls are separated from the pins as above described, and said balls are caused to roll by gravity into the ball box; the pins, in their gravity descent, are deflected so as to slide end foremost into the pin box 64. The subsequent elevation of the pin box 64 and the ball box 61 is followed by the tipping of the ball box so as to empty the balls into the transverse trough 27ª, by which they are returned to the other end of the alley, by gravity, through the movable trough 22 and fixed trough 27.

During this elevation, as above described, the pins are first shifted by the spreading of the sides 66 so as to lie in a single row; thereafter, the pins are raised upwardly between the pair of grooved alining and pin separating plates 117 and 118. Upon the lowering of the pin box, the pins follow the grooves 120 until intercepted by the cross bars 122, and thus said pins are left in triangular arrangement, in the same relative position as they occupied on the alley.

Thereupon said pins are moved forward in unison by the plate 117 to push the pins through the holes 123 in the triangular setting frame 144. Said setting frame is thereafter tilted into horizontal position to dispose the pins in proper relation on the alley, and simultaneously the slidable frame 169 is moved to release the pins from the setting frame and allow the latter to be raised away from said pins at the end of the cycle of operations of the machine.

I claim:

1. In a machine of the class described, a hopper for the reception of balls and pins, a pivoted framework adapted, in normal position, to support a portion of said hopper, a sweeping device carried by said framework, and means, operable by the movement of said framework to carry said sweeping device into operative position, for withdrawing the portion of the hopper supported thereby from the path of movement of said framework.

2. In a machine of the class described, mechanism for removing balls and pins from the surface of a bowling alley, including a sweeping member movable into operative position with respect to said alley, and a movable trough for the return of balls to a player, the movement of said sweeping member into operative position effecting the movement of said trough into ball receiving position.

3. In a machine of the class described, a pivoted framework, a sweeping device carried by said framework and normally held thereby in inoperative position, a ball trough pivoted on said framework, and means for moving said framework to carry said sweeping device into operative position, said movement carrying said ball trough into ball receiving position.

4. In a machine of the class described, a sweeping device operative with respect to the surface of a bowling alley to remove balls and pins therefrom, comprising a slidable member adapted to make contact, by gravity, with the surface of said alley, and means for rocking said slidable member to sweep said surface.

5. In a machine of the class described, a sweeping member adapted to rest by gravity on the surface of an alley, means for rocking said member about a fixed axis to sweep said alley, and means for permitting relative movement between said member and said axis.

6. In a machine of the class described, a sweeping mechanism for removing balls and pins from the surface of a bowling alley, comprising a member resting at one end by gravity on said alley, and means traversing said end of said member over the surface of said alley, comprising a rocking member in sliding contact with said first mentioned member.

7. In a machine of the class described, a rocking member, a sweeping member carried thereby with one end resting by gravity on the surface of an alley, and means for permitting sliding movement between said rocking member and said sweeping member, whereby the rocking of the former effects the traverse of said end in contact with said alley.

8. In a machine of the class described, a rocking member, a sweeping member carried thereby and capable of sliding movement with respect thereto, with one end of said sweeping member resting by gravity on the surface of an alley, means for rocking said rocking member in one direction to cause traverse of said end in contact with said alley, and means, operable by the rocking of said member in the other direction to retain said sweeping member out of contact with said alley.

9. In a machine of the class described, a sweeping member, normally held in inoperative position, means for moving said member into operative position, with an end thereof resting by gravity in contact with the surface of an alley, means for traversing said end, in one direction, over the surface of said alley to sweep the balls and pins off of said surface, means, operable by the return movement of said sweeping member, to lock said end out of contact with said alley, and means, operable by the movement of said sweeping member, to inoperative position, for releasing said locking means.

10. In a machine of the class described, a member providing an inclined surface for the gravity descent of balls and pins, said surface having a transversely inclined trough for deflecting the balls.

11. In a machine of the class described, a ball and pin receiving element providing for the gravity descent of balls and pins, and an obstruction in the path of said balls and pins adapted to permit the passage of pins, and to intercept the passage of balls.

12. In a machine of the class described, a hopper for the reception of balls and pins from the surface of a bowling alley, said hopper having an inclined bottom over which said balls and pins descend by gravity, and means, spaced above said surface, for intercepting the gravity descent of the balls thereon, said means permitting the passage of pins thereby.

13. In a machine of the class described, a hopper providing an inclined surface for the gravity descent of balls and pins, said surface having a transversely inclined groove therein, a ball obstructing means for interrupting the gravity descent of balls on said surface as they reach said groove, whereby the balls roll transversely across said surface, said obstructing means being spaced sufficiently above said surface to permit the continued gravity descent of the pins.

14. In a machine of the class described, a hopper providing an inclined surface for the gravity descent of pins, and means projecting into the path of pins on said surface for contacting with the ends of said pins, whereby said pins, in their descent on said surface, are slewed around into endwise position thereon.

15. In a machine of the class described, a hopper for the reception of balls and pins from the surface of a bowling alley, a setting mechanism movable into operative position to dispose the pins on said alley, and means normally closing the mouth of said hopper, said means being rendered inoperative by the return of said setting mechanism to inoperative position.

16. In a machine of the class described, a hopper for the reception of balls and pins from the surface of a bowling alley, a pivoted closure for the mouth of said hopper, a setting mechanism adapted in one position to receive the pins, and in another position to dispose them on said alley, and means, operable by the movement of said setting mechanism into pin receiving position, for moving said pivoted closure to open the mouth of said hopper.

17. In a machine of the class described, an element having an inclined surface for the gravity descent of pins, a receptacle for receiving pins from said surface, a trough for conducting pins from said surface into said receptacle, and means for moving said trough to permit the elevation of said receptacle.

18. In a machine of the class described, a vertically movable receptacle, a trough for conducting pins into said receptacle when the latter is at one end of its movement, and means for moving said trough out of the path of said receptacle after the latter has received the pins.

19. In a machine of the class described, a conducting hopper for the pins, a receptacle for receiving pins from said hopper, means for moving said receptacle above the discharge end of said hopper, and means for closing said discharge end after the pins are received in said receptacle.

20. In a machine of the class described, a pin box for the reception of pins in superposed rows, and means, operable by the elevation of said pin box, for disposing said pins in a single row.

21. In a machine of the class described, a pin box having a pin receiving surface of limited extent, whereby the pins are disposed thereon in superposed rows, and means, operable by the elevation of said pin box, for extending said surface, to permit the arrangement of said pins in a single row.

22. In a machine of the class described, a pin box normally disposed in pin receiving position, and having hinged sides to confine the pins received in a plurality of rows, means for elevating said pin box, and means, operable by the elevation of said pin box, for swinging said sides outwardly, to permit the disposition of the pins confined thereby in a single row.

23. In a machine of the class described, a pin receptacle adapted to confine the pins received thereby in a plurality of rows, means, operable by the elevation of said receptacle, to extend its pin supporting surface, whereby the pins may be disposed in a single row, and means for forcibly striking said pins during the elevation of the pin receptacle, to effect their disposition in a single row.

24. In a machine of the class described, a pin receptacle adapted to confine the pins received thereby in a plurality of rows, means, operable by the elevation of said receptacle, for extending its pin supporting surface, whereby the pins are permitted to dispose themselves by gravity in a single row, and means for separating certain of said pins, during the elevation of said receptacle, whereby other pins may pass by gravity into the row containing said separated pins.

25. In a machine of the class described, a pin box for the reception of pins in a plurality of rows, means operable by the elevation of said pin box to extend its pin supporting surface, whereby the pins are permitted to dispose themselves in a single row, means for forcibly striking the tops of the pins, to drive them into a single row, and means for separating certain of said pins, to permit other pins to descend into the row containing said separated pins.

26. In a machine of the class described, a pin receptacle, a ball receptacle pivoted thereto, a pivoted ball receiving trough above said receptacles, means for elevating said receptacles, and means operable by the elevation of said receptacles for tilting said ball receptacle as it is carried above said trough.

27. In a machine of the class described, a pin receptacle, a ball receptacle pivoted thereto, a pivoted ball receiving trough above said receptacles, means for elevating said receptacles, means operable by the elevation of said receptacles for tilting said ball receptacle as it is carried above said trough, and means operable by the elevation of said receptacles for tilting said trough into inclined position.

28. In a machine of the class described, means for elevating a plurality of pins arranged in a single row, a member having a surface with a plurality of grooves corresponding to the number of pins in said row, and opposing the ends of said pins, means for moving said member toward said pins, to aline each pin with the end of one of said grooves, and means for depressing said row of pins, to cause the travel of each pin to the bottom of its corresponding groove.

29. In a machine of the class described, a member having a plurality of grooves of different lengths, with the upper ends of said grooves in alinement, means for supporting a single row of pins, with the ends of said pins received in said grooves, and means for depressing said pins, to permit each pin to travel to the end of its corresponding groove.

30. In a machine of the class described, a member having different length grooves in its surface, for the reception of the ends of a row of pins, whereby the descent of said row effects the arrangement of said pins in a predetermined form, a second member having apertures to receive the opposite ends of said pins, and means for moving said members together, to cause the projection of said pins through said apertures.

31. In a machine of the class described, a pair of spaced members having their opposing surfaces provided with grooves of different lengths, for the reception of the opposite ends of a plurality of pins, whereby the lower ends of said grooves retain said pins in a predetermined arrangement, one of said members having apertures therethrough at the ends of its grooves, and means for moving the other member inward, to project said pins through said apertures.

32. In a machine of the class described, a pair of spaced members having opposing grooves engaging the ends of the pins, to retain them in predetermined arrangement, a framework adjacent said members, having apertures corresponding to the arrangement of the pins held by said members, means for transferring the pins from said members to the apertures of said framework, and means for locking said pins in the apertures of said framework.

33. In a machine of the class described, a pair of spaced members having opposing grooves engaging the ends of the pins, to retain them in predetermined arrangement, a framework adjacent said members, having apertures corresponding to the arrangement of the pins held by said members, means for transferring the pins from said members to the apertures of said framework, means for locking said pins in the apertures of said framework, and means for moving said framework, to carry said pins into position on an alley.

WALTER O. WHEELER.

Witnesses:
NELLIE WHALEN,
PENELOPE COMBERBACH.